Aug. 19, 1952   J. W. HESSION, JR   2,607,573
AEROSOL GENERATOR

Filed Feb. 26, 1947   4 Sheets-Sheet 1

Fig. 1

INVENTOR
John W. Hession, Jr.
BY
ATTORNEYS

Aug. 19, 1952  J. W. HESSION, JR  2,607,573
AEROSOL GENERATOR

Filed Feb. 26, 1947  4 Sheets-Sheet 2

INVENTOR
John W. Hession, Jr
BY
Austin Wilhelm Carlson
ATTORNEYS

Aug. 19, 1952     J. W. HESSION, JR     2,607,573
AEROSOL GENERATOR Filed Feb. 26, 1947     4 Sheets-Sheet 4

INVENTOR
John W. Hession, Jr.
BY
ATTORNEYS

Patented Aug. 19, 1952

2,607,573

UNITED STATES PATENT OFFICE 2,607,573

AEROSOL GENERATOR

John W. Hession, Jr., Darien, Conn.

Application February 26, 1947, Serial No. 731,127

14 Claims. (Cl. 261—88)

This invention relates to aerosol generators and more particularly to a machine designed to effect a dispersion or diffusion of a selected liquid into particles which are extremely minute and substantially homogeneous in size and adapted to be readily air-borne for substantial distances. This application is a continuation-in-part of my copending application Serial Number 654,610, filed March 15, 1946.

The term "aerosol" is generally accepted in scientific circles as a generic term to describe the size of particles which may be air-borne in varying degrees. Air-borne or aerosol particles may vary in size from one tenth (.1) micron diameter or less, to upwards of fifty (50) microns diameter. The extent to which an aerosol particle may be air-borne varies with its size or mass. As a rough approximation, it may be said that the cubic mass of a particle is approximately the cube of its diameter, and accordingly a particle which is one hundred (100) microns in diameter would possess approximately one thousand times the cubic mass of a particle of ten (10) microns diameter.

The drift of fine particles in normal air currents is largely determined by the size of the particle, or more particularly, its cubic mass. According to Stokes' law of falling particles, it has been determined that in a medium of still air, a particle of six microns in diameter will require approximately five minutes to fall one foot or thirty centimeters; a particle of ten microns diameter will require approximately two minutes to fall thirty centimeters; a particle of twenty microns diameter will require approximately one half minute to fall thirty centimeters; while a particle of sixty microns diameter will require approximately three seconds to fall thirty centimeters. Aerosol particles which are fifty microns and larger in diameter normally remain suspended in air for a relatively short time period, will drift comparatively very short distances only, and may be aptly classified as sprays. Therefore it may be said that a true aerosol has generally been considered as descriptive of particles which will be borne by normal air currents, and less than fifty microns diameter.

These scientific considerations are guiding factors in effecting diffusion of liquid insecticides, germicides, deodorants, fungicides, sterilizing agents, hormones and medicaments of the greatest importance to agriculture, industry and public health. The particle size of the diffused liquid in many instances determines the effectiveness of the liquid treatment, the quantity or volume of liquid necessary to effect the treatment, the area over which the dispersed liquid is effective, the uniformity of deposition and concentration, the cost of effecting the dispersion and the avoidance of concentrations to a degree which are harmful or objectionable.

In the field of entomology, for example, highly valuable insecticides have been developed whose effectiveness and applicability are to a large extent controlled and determined by particle size considerations. Localized concentrations of some insecticides as obtained by sprays generating particles of fifty (50) microns diameter and greater, may cause damage to useful life forms, such as bees and pollenating insects.

Entomologists have therefore appreciated the essential importance of effecting liquid insecticide dispersions in extremely fine particle size, wherein the required small quantity of insecticide is uniformly dispersed over the treated area, and in concentrations and particle size wherein the enemy insect is effectively destroyed, without damaging effects on useful insects and other useful life. Such effective light treatments can be practically obtained by aerosol dispersions wherein the particle size of the treating material ranges in the approximate mean average of eight to twenty microns in diameter, with an optional or mean average of eight to ten microns in diameter in the case of certain insect pests, while other hardier insect pests may require dispersions having particle size ranges in the approximate mean average of sixteen to twenty microns.

Aerosol dispersions having extremely fine and substantially homogeneous particle size have further extensive uses in fumigating, sterilizing, deodorizing, medication, and scenting and conditioning room and building interiors. Aerosol treatment of rooms and interiors is markedly effective where the particle size is properly controlled and reasonably homogeneous, since the liquid aerosol dispersion will drift and uniformly disperse through the atmosphere of the confined space, moving into all the spaces and crevices where air currents may enter and, finally be uniformly deposited above and beneath projecting surfaces which, when properly controlled, leaves no visible or objectionable deposit. The air in rooms and interiors can thus be sterilized, fumigated, deodorized, scented and tempered by the use of controlled amounts of the liquid material containing the chemical ingredients desirable for the purpose. Building interiors and livestock may also be treated with liquid insecticides to destroy flies and other insects by proper aerosol treatment in controlled concentrations for either present or residual effects. Germicides, medicaments and hormones can also be effectively dispersed with highly successful effects in the treatment and medication of both plant and animal life. The effectiveness and desirability of a particular aerosol treatment is governed by the uniformity of the dispersion in proper and allowable amounts, depending in turn on the propagation of aerosol particles of controlled and substantially homogeneous size.

Monumental efforts have been devoted to the development and invention of aerosol generators which will generate a liquid aerosol dispersion of controlled and substantially uniform particle size. Various machines and devices have been developed and tested, including spray nozzles through which the liquid material is ejected under high pressures, machines utilizing combustion gases and superheated steam, and aerosol bombs. Prior art machines and devices heretofore developed have either failed to produce aerosols having the particle size uniformity which proper treatment conditions require, or which create fire or health hazards, or which require the dispersion of the liquid material in gases which are so highly heated as to damage the effectiveness and usefulness of the treating liquid, or which are cumbersome, expensive, difficult to control and operate, or which require expensive propelling agents and adulterants.

In accordance with this invention, an aerosol generator is provided which is simple in design and construction, economical to manufacture, substantially fool-proof in operation and which propagates an aerosol whose particle size may be adjusted and regulated, with the particles having an extremely high degree of size uniformity.

An important feature of this invention is the provision of an improved dispensing head comprising stacked dispensing discs which are preferably made of wear resistant metal and preferably present substantially smooth facing surfaces. The discs may be conveniently stacked in one or more groups or head sections, each head section comprising triplicate discs, the inner and outer discs of each section being slightly dish-shaped and the intermediate disc being relatively flat. The head section is supported upon a drive shaft which may be made tubular in form to provide a passage therethrough for the aerosol liquid supplied to the central area of the dispensing discs through a plurality of radial port holes in the tubular wall thereof.

The head section is provided with a distributor member positioned between the inner and outer dispensing discs, the distributor member having a plurality of radiating passages through which the aerosol liquid discharging from the feed tube is conducted and substantially evenly distributed between the adjacent surfaces of the dispensing discs which are spaced apart a small distance at the central area thereof. The peripheral facing portions of the grouped dispensing discs are preferably in substantially face-to-face contact and are so held by the shape and resilient characteristics of the inner and outer dispensing discs which form a part of the dispensing head section. The central areas of the inner and outer dispensing discs are reinforced and compressed between clamping members which are rigidly mounted on the drive shaft. A plurality of similar head sections may be mounted upon the same drive shaft, or if desired separate drive shafts may be provided for each group of dispensing discs.

The aerosol liquid conducted between the adjacent surfaces of the dispensing discs is sheeted and filmed therebetween as the film layers move outwardly to the disc peripheries under the impelling influence of the high speed rotation of the dispensing head. The material is discharged from the disc peripheries in fine aerosol particles possessing remarkable size uniformity. The aerosol liquid may be supplied to the dispensing member by a suitable liquid feed tube, and may advantageously be conducted through the tubular drive shaft. The rotating dispensing discs develop a vacuum area therebetween which serves to draw the aerosol liquid through the feed tube and into the seams defined between the central facing portions of the dispensing discs.

Means are provided to control the volume flow of the aerosol liquid through the feed tube as supplied to the adjacent surfaces of the dispensing discs. With a given diametric size of rotating surfaces, rotating at a given speed, the particle size of the aerosol produced can be nicely regulated by the simple expedient of controlling the amount of flow of the aerosol liquid to the dispensing discs. The particle size of the propagated aerosol may also be varied by varying the diametric size of the dispensing discs, or by varying the speed of rotation of the discs, or both.

The dispensing discs are designed to be rotated at high speed by any suitable power unit or driving device such as an electric motor, gas or steam turbine, or combustion engine. The aerosol particles discharge from the peripheries of the dispensing discs in the approximate plane of the dispensing discs. In many aerosol treatment operations, it is desirable to direct the aerosol particles propagated by the dispensing discs in a direction generally forwardly of the dispensing discs. This may be accomplished by the provision of a blower assembly comprising a blower fan fixed to the drive shaft to rotate therewith, the blower fan being housed within a casing having a tubular wall whose end extremity terminates in the approximate plane of the dispensing discs and which is spaced therefrom to define a throat opening of the required shape to direct the air stream generally transversely of the peripheries of the dispensing discs. The blower housing is provided with suitable straightener vanes which serve to rectify the air stream produced by the blower so that the air stream discharged through the throat opening will cradle the aerosol particles discharged from the dispensing discs and direct and carry the aerosol particles generally forwardly of the dispensing discs. The blower assembly may be of any desired capacity to carry the aerosol particles the desired distance before coming under the air-borne influence of the normal atmospheric currents.

An object of this invention is to provide an aerosol generator designed to produce and generate an aerosol having particle size of substantial homogeneity.

Another object of this invention is to provide an improved dispensing head of high output capacity by means of which the particle size of the propagated aerosol may be predetermined and controlled.

Another object of this invention is to provide an aerosol generator which is simple and compact in design and construction, which may be constructed in various sizes and forms best suited for the particular aerosol treatment for which the generator is to be used, which may be powered and driven by almost any desired power unit, and which is highly practical in use, economical to manufacture, and flexibly adapted to the various purposes of the aerosol propagation.

Other objects and advantages of this invention will become apparent as this description proceeds.

Although the characteristic features of the invention will be particularly pointed out in the claims appended hereto, the invention itself, and the manner in which it may be carried out, may be better understood by referring to the following description taken in connection with the accompanying drawings forming a part hereof, in which

Similar reference characters refer to similar parts throughout the several views of the drawings and specification.

There is shown in the drawings a practical embodiment of this invention having dispersion means operative to propagate aerosols of controlled and homogeneous particle size. The generator comprises a dispensing head 1 which incorporates a plurality of the dispersion discs which present their adjacent peripheral surfaces in face-to-face contact. The dispensing head 1 is fixed to a hollow shaft 20 to which power is applied to rotate the dispersion head. The aerosol liquid is supplied to one end of the rotatable shaft conduit 20 through a connecting device 30 which provides a leak-proof seal between the end of the rotatable feed shaft 20 and the stationary aerosol supply conduit 31. A fan or blower assembly 40 is fixed to rotate with the feed shaft 20 and is designed to impel a stream of air across the peripheries of the dispensing discs to give direction to the aerosol particles propagated by the dispensing head. The feed shaft 20 and the associated dispensing head 1 and the blower 40 may be rotated by any suitable power source such as an electric motor, gas or steam turbine, or a combustion engine.

The dispensing head essentially comprises a plurality of stacked dispensing plates which are spaced apart a slight distance adjacent the central area thereof so that the aerosol liquid may be supplied to the space between the adjacent faces of the dispensing discs. The adjacent side faces of the discs at the peripheral areas thereof are in substantially face-to-face contact to present surfaces between which the aerosol liquid is filmed to minute thickness. The dispensing discs are preferably formed of non-corroding metal of high tensile strength, may be substantially uniform in thickness and preferably present smooth and polished surfaces.

Figure 1:
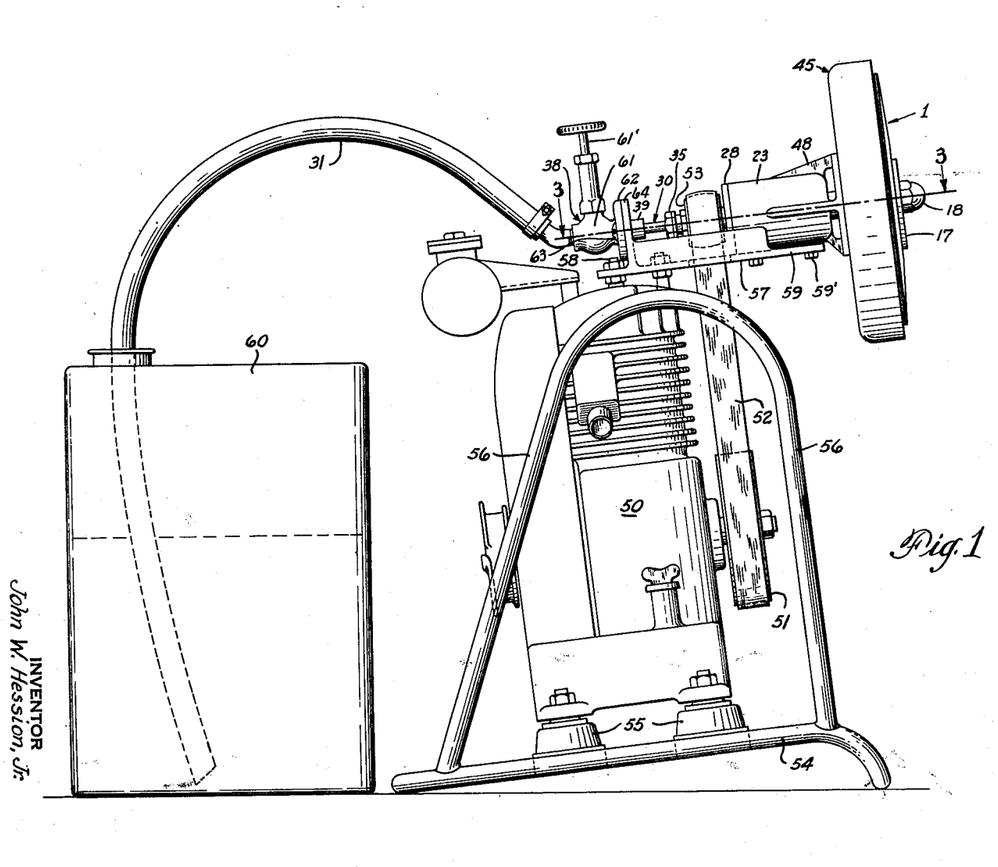
Fig. 1 is a side elevational view of the improved aerosol generator as driven by a combustion engine.
Figure 2:
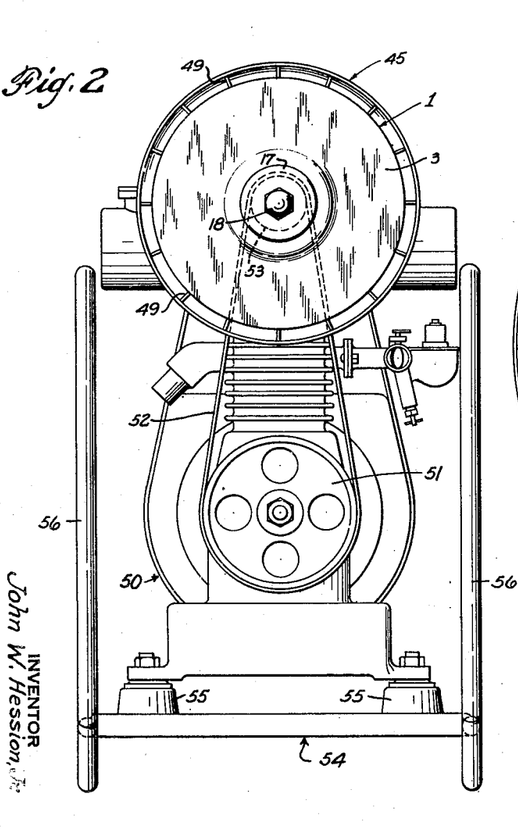
Fig. 2 is a front elevational view of the aerosol generator shown in Fig. 1.
Figures 3, 4, 5:
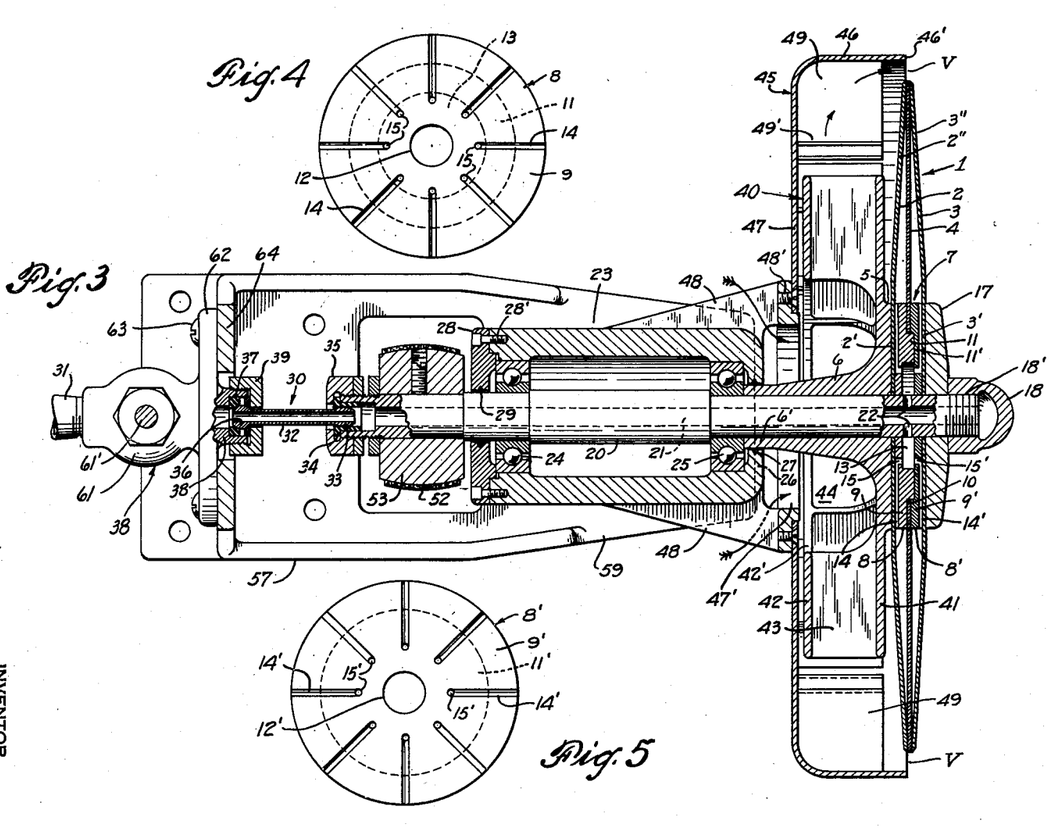
Fig. 3 is an enlarged longitudinal cross-sectional view of the aerosol generator showing structural details of the dispensing head and associated blower fan, hollow feed shaft and bearing assembly as the same would appear when viewed along line 3—3 of Fig. 1.
Fig. 4 is a face view of one section of the distributor hub associated with dispensing head shown in Fig. 3.
Fig. 5 is a face view of the companion section of the distributor hub associated with the dispensing head shown in Fig. 3.
Figure 6:
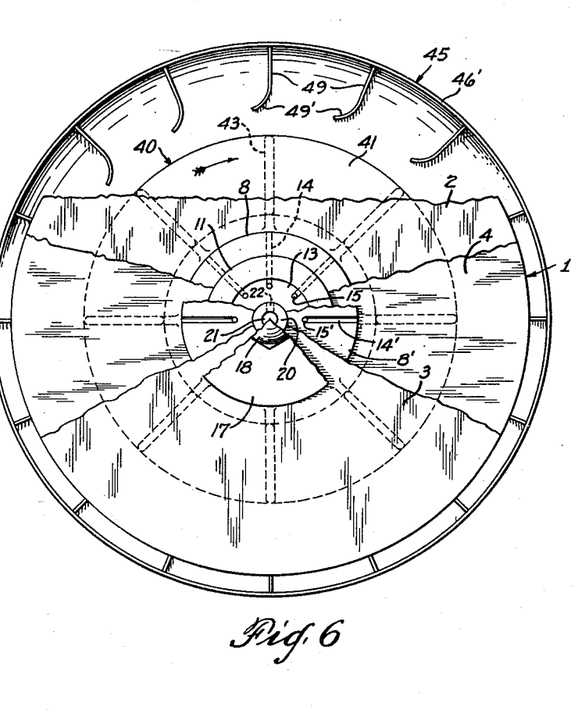
Fig. 6 is an enlarged front elevational view of the dispensing head and blower fan assembly, certain parts being shown broken away to illustrate further structural details.

In the embodiment illustrated in Fig. 3, the dispensing head 1 is formed from a pair of exterior dispensing discs 2 and 3 and an intermediate dispensing disc 4 whereby two complete filming surfaces are formed between the adjacent faces thereof. The outer discs 2 and 3 are somewhat dish-shaped while the intermediate disc 4 is relatively flat. All the discs are substantially the same diameter and may be made of substantially uniform thickness of a non-corroding metal of high tensile strength.

The dispensing disc 2 is provided with a central aperture whereby the disc may be snugly telescoped over the end of the tubular shaft 20. The disc 2 seats against a raised boss 5 associated with a hub member 6 which is fixed to the shaft 20. The boss 5 presents a snug seating surface for the disc 2 and provides a firm support for the relatively flat central section 2' of the disc, the flat center section 2' merging into a somewhat dish-shaped peripheral section 2''. The outer dispensing disc 3 is likewise formed to present a relatively flat center section 3' and a somewhat dish-shaped peripheral section 3''. A distributor hub 7 is positioned between the center sections 2' and 3' and thus provides a spacing support for the outer discs 2 and 3.

The distributor hub 7 is formed of two companion sections 8 and 8'. The distributor hub sections 8 and 8' present interfitting rim portions 9 and 9' between which the inner peripheral edge portion 10 of the intermediate dispensing disc 4 is snugly clamped as shown in Fig. 3. The matched hub sections 8 and 8' also present intermediate collar portions 11 and 11' which snugly interfit to retain the hub sections in proper aligned position, and are provided with axial openings 12 and 12' through which the end of the hollow shaft 20 snugly telescopes. The companion section 8 presents a dish-shaped cavity 13 centrally thereof. The aerosol liquid escapes from the passage 21 in shaft 20 into the central cavity 13 of the distributor hub through small radially extending holes 22 extending through the side wall of the shaft 20.

The distributor hub sections 8 and 8' are provided with liquid grooves 14 and 14' which extend from the periphery thereof radially inwardly to axially extending holes 15 and 15' respectively, which tap the aerosol liquid in the reservoir cavity 13. Aerosol liquid supplied to the cavity 13 of the distributor hub 7 escapes through the axial bleeder holes 15 and is impelled by centrifugal force outwardly through the groove passages 14 to the inner space between the outer dispensing disc 2 and the intermediate disc 4 whose peripheral portions are maintained in face-to-face contact. Likewise aerosol liquid in the cavity 13 escapes through the axial holes 15' of distributor section 8' and thence outwardly through the grooves 14' to the space between the outer dispensing disc 3 and the intermediate facing disc 4 whose peripheral portions are maintained in close fitting contact.

A clamp plate 17 having approximately the diameter of the distributor hub 7 and the supporting boss section 5, is provided with a central aperture whereby it may be snugly telescoped over the outer end of the shaft 20 to closely seat against the center section 3' of the dispensing disc 3. A cap nut 18 having interior threads 18' is threaded to the projecting end of the feed shaft 20 and provides a means for clamping the discs 2, 3 and 4 and the distributor hub sections 8 and 8' between the raised boss section 5 of the hub member 6 and the clamp plate 17 in a manner to maintain the peripheral portions of the dispensing discs in substantially face-to-face contact.

Figure 7:
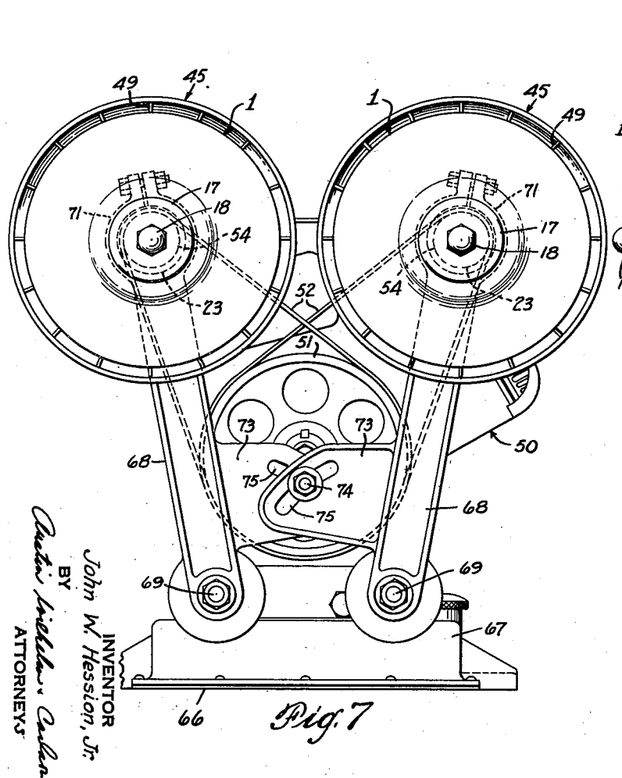
Fig. 7 is a front elevational view of an aerosol generator having a pair of dispensing heads driven from a common source of power such as a combustion engine.
Figure 8:
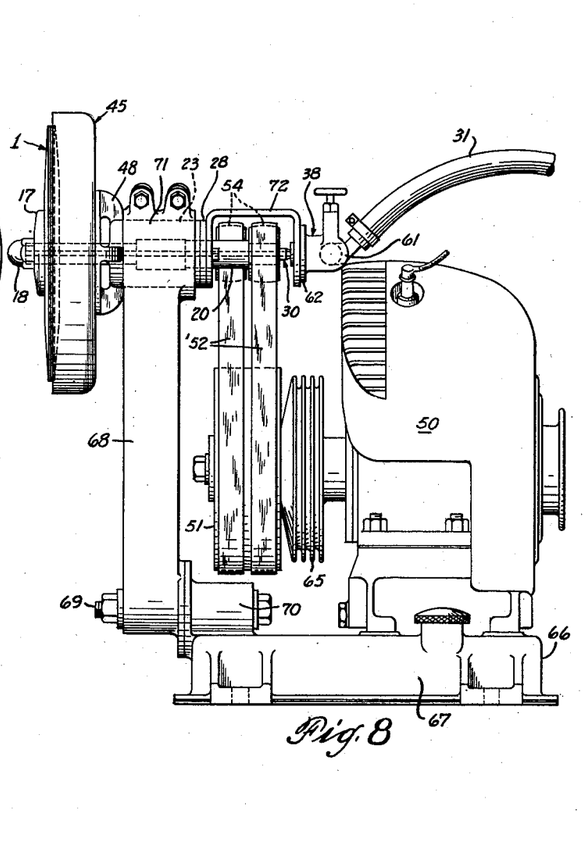
Fig. 8 is a side elevational view of the aerosol generator shown in Fig. 7.

The hollow drive shaft 20 may be rotatably supported in a bearing housing 23 containing a pair of spaced ring bearings 24 and 25. The bearing housing 23 may have an inturned flange portion 26 which supports a sealing ring 27 and which provides a bearing seal with the hub portion 6' of the hub 6. The other end of the bearing housing 23 may be sealed by a closure plate 28 secured thereto by screws 28' and having a sealing ring 29 in contact with the shaft 20 to thus retain the bearing lubricant within the bearing housing 23.

Where the drive shaft is used to supply the aerosol liquid to the dispensing head as shown in Fig. 3, it may be desirable to provide means 30 for connecting the end of a fixed supply conduit 31 to the rotatable shaft forming conduit 20. Connecting means found suitable for the purpose may comprise a connecting tube 32 having a ball shaped head 33 which snugly seats within a graphitic bearing member 34 which is inserted into the end of the hollow shaft 20. A cap nut 35 through which the tube 32 extends is threaded over the end of shaft 20 and may be tightened to compress the bearing member 34 in a manner so that the member 34 will snugly embrace the head portion 33 of the tube 32 and provide a leak-proof joint therebetween. The opposite end of the tube 32 is also provided with a ball shaped head portion 36 which is enclosed within a graphitic bearing member 37 which snugly seats within a conformed cavity formed in the end of a stationary connecting coupling 38. A cap nut 39 having an aperture through which the tube 32 extends is threaded to the coupling member 38 in a manner to compress the bearing member 37 snugly around the ball shaped head portion 36 to provide a leak-proof seal therebetween. Thus by means of the connection device 30, aerosol liquid may be supplied from the stationary feed tube 31 to the rotating feed shaft 20 and thence to the distributor head 1.

The blower fan 40 may be of any desired construction. In the embodiment shown in Fig. 3, the blower fan comprises a heavy back wall disc 41 which may be formed as a flange extension of the hub member 6. A side wall forming ring 42 is joined to the side wall disc 41 by a plurality of radially extending vanes 43. The fan is provided with a central space 44 which receives the entering air through the central opening 42' in the ring plate 42. The air is impelled from the periphery of the fan by the rotating impeller vanes 43.

A stationary cup-shaped casing 45 encloses the blower fan and presents a side wall portion 46 whose upper edge 46' terminates in the approximate plane of the intermediate dispersion disc 4 and is spaced from the periphery thereof to present a circumferentially extending air passage *v* therebetween. The enclosing casing 45 also presents an inturned bottom wall 47 having a central opening 47' through which air is admitted. The casing 45 may be held in fixed position as by means of webs 48 forming a part of the bearing casing 23 and fixed to the bottom wall 47 of the fan casing 45 as by screws 48'. A series of radially extending straightener vanes 49 may be fixed to the interior face of the side wall portion 46 of the casing, the straightener vanes 49 having curved ends 49' terminating at a point adjacent the peripheral ends of the blower vanes 43. The straightener vanes 49 remain stationary and serve to rectify the air discharged from the impeller vanes 43 in a tangential direction, to a generally axial direction so that the aerosol particles emerging from the periphery of the dispensing head will be cradled by the air stream and initially directed forwardly of the dispensing head.

The aerosol generator shown in Fig. 3 may be driven by any suitable power unit such as a combustion engine 50 having a pulley wheel 51 carrying a driving belt 52 which may be trained over a suitable pulley wheel 53 fixed to the hollow drive shaft 20. The combustion engine may be supported upon a suitable base frame 54, and the engine may be mounted on suitable resilient cushions 55 to reduce vibration. The supporting frame 54 may also be provided with protective guard frames 56. In the construction here shown, the aerosol generator unit may be mounted on the engine frame by means of a suitable bracket 57 secured to the engine frame as by bolts 58. The bracket 57 has an extension 59 which may be secured as by bolts 59' to the bearing housing 23.

The aerosol liquid may be contained in any suitable supply tank 60 into which the stationary supply conduit or hose 31 may be inserted, the hose line 31 being connected to the connecting coupling 38. The connecting coupling 38 may incorporate a valve 61 which may be manipulated by valve stem 61' to control the flow of aerosol liquid to the connecting tube 32 and hence to the drive shaft 20 and dispensing head. The connecting coupling 38 may be provided with a suitable flange portion 62 which may be secured as by screws 63 to the plate portion 64 of the bracket 57. The liquid is drawn through the tube 31, the tubing 32, the hollow shaft 20 and into the central space of the dispensing head by the suction or vacuum created by the rotating dispersion discs. The flow of liquid to the dispensing head may be controlled by the valve 61.

There is shown in Figs. 7 and 8 an aerosol machine which incorporates therewith a pair of aerosol generator units of the general form shown in Fig. 3 driven from a common power source. As here shown, the combustion engine 50 has a drive shaft connected to pulley wheel 51 through a suitable clutch mechanism 65. The combustion engine 50 is mounted upon a suitable base 66 which may also have a gasoline supply tank 67 associated therewith. Each dispensing head is supported by a vertical arm 68, the lower end of which is pivotally mounted on a stud shaft 69 supported in a bearing bracket 70 attached to the base 66. The bearing housing 23 is supported at the upper end of the supporting standard 68 and may be held in position by a suitable clamp ring 71. The bearing housing 23 rotatably supports the tubular drive shaft 20 on which the dispensing head 1 and the blower fan 40 are mounted as in the manner heretofore described.

Each dispensing head shaft is provided with a pulley wheel 54, and each pulley wheel carries a drive belt 52 which is trained around the pulley wheel 51 of the driving motor 50 as shown in Figs. 7 and 8. The paired head supporting standards 68 may be adjusted in space relationship to maintain the driving belts 52 in taut position by the provision of a bracket arm 73 extending laterally from each of the standards 68, the brackets 73 being adjustably secured together by an adjusting bolt 74 extending through arcuate slots 75 formed in the brackets as shown in Fig. 7.

In operation, the hollow shaft 20 and the associated dispensing head 1 and blower fan 40 are rotated at a speed effective to obtain the desired aerosol treatment. During initial rotation of the dispensing head, the air which is pocketed in the distributor hub 7 and the space between the dispensing discs is quickly expelled by the centrifugal force, and a substantial vacuum is accordingly created in the space between the dispersion discs which draws the aerosol liquid through the tube passage 21, through the connecting tubing 32 and the fixed tubing 31. In the few seconds required to bring the dispersion discs up to speed, the suction effect created will fill the tube passage 21 with the liquid, which then will emerge through the passages 13, 15 and 15', 14 and 14' of the distributor hub 7 and thus reach the space between the dispensing discs 2, 3 and 4. Centrifugal force drives the aerosol liquid outwardly between the adjacent surfaces of the dispensing discs, causing the liquid to be squeezed and filmed into a minute film between the contact faces of the dispensing discs, and then discharged from the periphery of the discs in extremely fine particles which are substantially homogeneous in size and within the classification of true aerosols. The aerosol particles centrifugally discharged from the rim of the dispensing discs will be picked up by the air stream generated by the blower 40 as the air stream travels through the opening $v$ between the casing edge 46' and the periphery of the dispersion discs. The air stream traveling through the opening $v$ changes the course of movement of the aerosol particles, initially moving in the general plane of the dispensing discs, to a direction generally normal to the plane of the dispensing discs.

In its fundamental aspects this improved aerosol generator comprises essentially a series of stacked dispensing discs having the peripheral surface portions thereof in substantially face-to-face contact. The stacked dispensing discs present a central space or cavity therebetween to receive the aerosol liquid, which in the illustrative embodiment shown in Fig. 3 is supplied by the distributor hub 7. At least the peripheral edge portions of the dispensing discs should present adjacent surfaces in substantially smooth fitting contact. Unless the dispersion discs have uniform and even edge contact between which the film of liquid is squeezed, an aerosol of small, plus uniform, particle size cannot be expected. The dispersion discs should either be resilient or resiliently mounted to maintain a predetermined pressure contact between the peripheral portions of the adjacent surfaces. This is effected in the embodiment shown in Fig. 3 by forming the dispensing discs 2 and 3 of resilient metal with the peripheral portions 2'' and 3'' thereof somewhat dish-shaped in contour. The peripheral faces of the discs 2 and 3 are maintained in resilient face-to-face contact with adjacent peripheral surfaces of the intermediate disc 4 when the discs are clamped between the adjacent raised boss section 5 and the clamp plate 17.

The dispensing discs are preferably, but not essentially, circular in shape, and may vary from 2 to 3 inches in diameter to 20 or more inches in diameter. The dispersion discs should be mounted to rotate at relatively high speed to effect a peripheral velocity of from approximately 50 feet per second to several hundred feet per second and upwards, depending upon the aerosol liquid used, the particle size to be produced, and the volume rate at which the aerosol liquid is fed to the dispensing head. By the use of three dispensing discs 2, 3 and 4 arranged as shown in Fig. 3, two complete and separate aerosol streams may be projected from a single dispensing head. It will be appreciated that additional sets of dispensing discs may be attached to the drive shaft 20 to further increase the output of the unit.

The size of the aerosol particles may be controlled by controlling the volume of aerosol liquid admitted to the dispersion discs. It will be appreciated that an increasing volume of aerosol liquid supplied to the dispensing head will exert a corresponding greater pressure against the adjacent disc surfaces as the liquid film moves outwardly. The increased pressure may be such as to cause a slight separation of the adjacent peripheral surfaces of the dispensing discs which will result in the propagation of an aerosol of larger particle size. It will thus be appreciated that the particle size characteristic of the aerosol may be controlled by controlling the volumn flow of the aerosol liquid to the dispensing discs.

The central space between the dispensing discs may be supplied with the selected aerosol liquid by means of a stationary or rotating liquid feed tube. Conveniently, the liquid feed tube may form a part of the power shaft used in driving the unit. The associated blower fan is provided for the purpose of giving direction to the aerosol propagated by the dispensing head. The dispensing head may be driven by any convenient source of power such as an electric motor, steam or gas turbine, steam or gas engine, compressor or other like power unit best adapted for the particular aerosol treatment.

Aerosol generators may be made in accordance with this invention to produce aerosols of any selected particle size ranging from one to two microns diameter up to the upper ranges of aerosol particle sizes, and the aerosol particles of the selected size may be maintained substantially uniform. Where particle sizes of only a few microns diameter are desired, the adjacent peripheral faces of the dispersion discs should be polished and closely lapped so as to present smooth surfaces in face-to-face contact when stationary, and the volume of aerosol liquid fed between the discs should be limited and carefully controlled so that the pressure exerted by the liquid moving outwardly between the adjacent faces of the discs will not noticeably separate the closely contacting surfaces of the dispensing discs. By increasing the liquid flow to the dispensing discs, a corresponding increased separating pressure may be exerted against the adjacent surfaces of the dispensing discs to thereby increase the size of the aerosol particles produced.

The substantial size uniformity of the produced aerosol, as well as the control of particle size which may be effected through the use of this improved aerosol generator, makes this aerosol generator ideally suitable for numerous aerosol treatments in the fields of entomology, agronomy, animal husbandry, public health, sanitation and medicine. Aerosol generators made in accordance with this invention may be made small and compact for interior use, as where only a few cubic centimeters of aerosol liquid is to be dispensed in one treatment, to larger aerosol generators having dispensing heads designed to convert aerosol liquid to the desired aerosols at the rate of fifty or more gallons per hour, which larger capacities are particularly useful in the treatment of insect infested land areas. Aerosol generators may be made in accordance with this invention of almost any desired size and capacity to produce aerosols of controlled homogenous particle size for almost any aerosol treatment purpose.

It is understood that the principles of this invention may be embodied in various modifications and adaptations, and it will be accordingly appreciated that this invention is not limited to the particular embodiments described and illustrated, and that various revisions, substitutions and changes may be made by those skilled in the art without departing from the teachings of this invention.

What I claim is:

1. A machine for converting liquids to aerosols which includes, dispersion plates having resilient peripheral portions and presenting a plurality of pairs of adjacent filming surfaces, means to maintain the central area of said surfaces in predetermined space relationship and the peripheral paired areas thereof in resiliently contiguous relationship when stationary, means for feeding the aerosol liquid into the axially related spaces defined by the spaced central surface areas of said plates, and means for rotating said dispersion plates to centrifugally eject the liquid from the periphery of said dispersion plates.

2. A machine for converting liquids to aerosols whose range of particle size is in the approximate mean average of five to fifty microns in diameter which includes, a plurality of superimposed dispersion plates having resilient peripheral portions and presenting a plurality of pairs of adjacent surface areas, means to maintain the central surface areas of said dispersion plates in limited spaced relationship and the peripheral paired surface areas thereof in closely fitted resiliently contiguous relationship when stationary, a distributor member positioned centrally of said dispersion plates operative to distribute the aerosol liquid supplied to the distributor member into the axially related spaces defined by the spaced central surface areas of said dispersion plates, and means for rotating said dispersion plates at a peripheral speed of fifty feet per second and upwards to centrifugally eject the liquid as aerosol particles from the periphery of said dispersion plates.

3. A machine for converting liquids to aerosols which includes, a plurality of sheet metal dispersion members having resilient peripheral portions and presenting a plurality of pairs of adjacent surface filming areas, means to maintain the inner surface areas of said dispersion members in limited spaced relationship and the peripheral surface areas thereof in resiliently pressed contiguous relationship when stationary, a distributor member positioned centrally of said dispersion members operative to distribute the aerosol liquid supplied to the distributor member into the axially related spaces defined by the spaced central surface areas of said dispersion members, and means for rotating said dispersion members and distributor member in unison.

4. A machine for converting liquids to aerosols which includes, at least three peripheral dispersion plates having resilient peripheral portions and presenting at least two pairs of adjacent surface filming areas, means to maintain the central surface areas of said plates in limited spaced relationship and the peripheral surface areas thereof in closely fitted resiliently pressed contiguous relationship when stationary, a distributor member positioned centrally of said dispersion plates having a plurality of series of radiating passages operative to evenly distribute the aerosol liquid supplied to the distributor member circumferentially of the spaces defined by the spaced central surface areas of said dispersion plates, said distributor member having an axial passage to evenly distribute the aerosol liquid to the several series of radiating passages, and means for rotating said dispersion plates at a peripheral speed of fifty feet per second and upwards to centrifugally eject the liquid as aerosol particles from the periphery of said dispersion plates.

5. A machine for converting liquids to aerosols which includes, a dispensing head having resilient dispersion plates having resilient peripheral portions and presenting a plurality of pairs of adjacent filming surfaces, means to maintain the inner surface areas of said plates in fixed space relationship and the peripheral surface areas thereof in resiliently pressed contiguous relationship when stationary, means for feeding the aerosol liquid into the spaces defined by the spaced inner surface areas of said plates, means for rotating said dispersion plates at predetermined speed to centrifugally eject the liquid from the periphery of said dispersion plates in a plurality of streams, and means associated with said feeding means for controlling the rate of flow of the aerosol material to said dispersion plates to thereby regulate the particle size of the aerosol projected from the periphery of said dispersion plates.

6. A machine for converting liquids to aerosols which includes, a dispensing head comprising at least three dispensing discs arranged in stacked relationship, said dispensing discs being substantially of equal exterior diameter and having resilient peripheral portions and presenting adjacent filming surfaces, means to maintain the adjacent inner surface areas thereof in spaced relationship and the adjacent peripheral surface areas thereof in resiliently pressed contiguous relationship when stationary, a distributor member positioned centrally of said dispersion discs, a tubular shaft fixed to said dispensing discs and distributor member, said tubular shaft having a discharge outlet through which the aerosol liquid is supplied to said distributor member, said distributor member having radiating passages positioned to direct the aerosol liquid into axially related spaces presented by the spaced inner surface areas of said dispensing discs, and means for rotating said dispensing discs.

7. A machine for converting liquids to aerosols which includes, a dispensing head comprising resilient triplicate dispensing discs arranged in stacked relationship, said dispensing discs being substantially of equal exterior diameter and having resilient peripheral portions and presenting adjacent filming surfaces, means to maintain the adjacent inner surface areas thereof in spaced relationship and the adjacent peripheral surface areas thereof in resilient pressed contiguous relationship when stationary, a distributor member positioned centrally of said dispensing discs, a tubular shaft fixed to said dispensing discs and distributor member, said tubular shaft having a discharge outlet through which aerosol liquid is supplied to said distributor member, said distributor member having radiating passages positioned to direct the aerosol liquid into the axially related spaces presented by the spaced inner surface areas of said dispensing discs, means for rotating said dispensing discs at predetermined speed, and flow control means associated with said tubular shaft for controlling the flow of aerosol liquid to said dispensing discs to thereby regulate the mean average size of the aerosol particles projected from the periphery of said dispensing discs.

8. A machine for converting liquids to aerosols which includes, a dispensing head having dispersion plates having resilient peripheral portions and presenting adjacent filming surfaces, means to maintain the inner surface areas of said dispersion plates in fixed space relationship and the peripheral surface areas thereof in resiliently contiguous relationship when stationary, means for feeding the aerosol liquid into the spaces defined by the spaced inner surface areas of said dispersion plates, a blower assembly including a blower impeller operative to impel a gaseous stream, the impeller of said blower being positioned adjacent said head, a directive casing associated with the blower impeller presenting a tubular wall having its terminal edge positioned adjacent to and spaced from the periphery of said dispersion plates, a drive shaft for rotatably supporting said dispensing head and blower impeller, and means for roating said drive shaft to centrifugally eject the aerosol particles from the periphery of said dispersion plates and to substantially simultaneously create a gaseous stream moving transversely across the rotating periphery of said dispersion plates to entrain the propagated aerosol particles in said gaseous stream.

9. A machine for converting liquids to aerosols which includes, a dispensing head having dispersion members presenting adjacent filming surfaces, a blower assembly including a blower impeller positioned adjacent said dispensing head operative to propel a gaseous stream, a directive casing associated with the blower impeller presenting a side wall having its terminal edge positioned adjacent to and spaced from the periphery of said dispersion members, straightening blades adjacent the periphery of impeller and adjacent said head, a drive shaft having enclosed bearings for rotatably supporting said dispensing head and blower impeller, a driving device for rotating said drive shaft to centrifugally eject the aerosol particles from the periphery of said dispersion members and to substantially simultaneously create a gaseous stream moving transversely across the rotating periphery of said dispersion members to entrain the aerosol particles in said gaseous stream.

10. A machine for converting liquids to aerosols which includes, a dispensing head having dispersion members presenting adjacent filming surfaces, a blower assembly including a blower impeller positioned adjacent said dispensing head operative to propel a gaseous stream, a directive casing associated with the blower impeller presenting a side wall having its terminal edge positioned adjacent to and spaced substantially directly opposite from the periphery of said dispersion members, a tubular drive shaft for rotatably supporting said dispensing head and blower impeller, said tubular shaft having a discharge port through which the aerosol liquid is conducted from said tubular shaft to said dispensing head, a stationary aerosol liquid supply conduit, means providing a substantially leak-proof seal between said stationary supply conduit and said tubular shaft, and a driving engine for rotating said drive shaft to centrifugally eject the aerosol particles from the periphery of said dispersion members and to substantially simultaneously create a gaseous stream moving transversely across the rotating periphery of said dispersion members to entrain the aerosol particles in said gaseous stream.

11. In a machine for converting liquids into finely divided aerosol particles, a rotatable head comprising a plurality of plate-like dispersion members having resilient peripheral portions and substantially smooth peripheral surfaces, means for urging said dispersion members together so that their peripheral surfaces are in resilient continuous contact throughout the entire circumference when the head is stationary, the central portions of said members being spaced apart to form a central hollow space, a central shaft on which said dispersion members are mounted, said shaft having an internal duct communicating with said central space, said central space being otherwise closed, a reservoir for liquid having a stationary discharge conduit, means providing a substantial leak proof seal connecting the adjacent ends of said stationary discharge conduit and said tubular shaft, means for rotating said head and shaft at high speed, whereby the centrifugal force exerted on the liquid in said head forces it out between said resiliently pressed peripheral contacting surfaces and creates a suction in said central space to draw additional liquid from said reservoir.

12. In a machine for converting liquids into finely divided aerosol particles, a rotatable head comprising at least three plate-like dispersion members having resilient peripheral portions and substantially smooth peripheral surfaces, means for urging said dispersion members together so that their peripheral surfaces are in resilient continuous contact throughout the entire circumference when the head is stationary, the central portions of said members being spaced apart to form at least two central spaces, a hollow shaft supporting said head having a radially extending outlet duct, a distributing member on said shaft having an annular reservoir cavity in which liquid accumulates, said annular reservoir cavity communicating with the duct in said hollow shaft, sets of radiating ducts, said sets being axially spaced to feed their respective central spaces, the inner ends of said radiating ducts communicating with said annular reservoir cavity at points spaced inwardly from outermost part of said cavity, a reservoir for liquid communicating with said shaft duct, means for rotating said head at high speed, whereby the centrifugal force exerted on the liquid in said head forces it out between the adjacent peripheral surfaces of the dispersion members.

13. In a machine for converting liquids into finely divided aerosol particles, a rotatable head comprising a pile of dispersion plates having resilient peripheral portions, the center plate being substantially planar, the next adjoining plate, on either side, being dished with its concavity toward the center plate, whereby the central portions of said plates are spaced apart to form clearance spaces, the resilient peripheral margins of said plates being substantially smooth, a shaft, means for urging the central portions of said plates together and securing them on said shaft in such manner as to resiliently press said smooth peripheral margins together when the head is stationary, means supplying said clearance spaces with liquid, means for rotating said head whereby said liquid is discharged from between said pressed-together peripheral margins.

14. In a machine for converting liquids into finely divided aerosol particles, a rotatable head comprising three dispersion plates having resilient peripheral portions, the center plate being substantially planar, the outer plate, on either side, being dished with its concavity toward the center plate, whereby the central portions of said plates are spaced apart to form clearance spaces, the peripheral margins of said plates being substantially smooth, a hollow shaft, means for urging the central portions of said plates together and securing them on said hollow shaft in such manner as to resiliently press said smooth peripheral margins together when the head is stationary, a reservoir for the liquid, a stationary conduit extending from the interior of said reservoir outwardly, means providing a substantially leak proof seal connecting the adjacent ends of said stationary supply conduit and said hollow shaft, means for rotating said head at high speed, whereby liquid is drawn through said shaft and distributed between said clearance spaces, said liquid being discharged from between said pressed-together peripheral margins.

JOHN W. HESSION, Jr.

REFERENCES CITED

The following references are of record in the file of this patent:

UNITED STATES PATENTS

| Number | Name | Date |
|---|---|---|
| 409,978 | Kisinger | Aug. 27, 1889 |
| 930,483 | Kershaw | Aug. 10, 1909 |
| 976,350 | Ehrsam et al. | Nov. 22, 1910 |
| 1,040,885 | Clark | Oct. 8, 1912 |
| 1,236,073 | Fesler | Aug. 7, 1917 |
| 1,242,445 | Ittner | Oct. 9, 1917 |
| 1,267,166 | Bahnson | May 21, 1918 |
| 1,420,722 | MacLachlan | June 27, 1922 |
| 1,485,235 | Mauss | Feb. 26, 1924 |
| 1,585,393 | Laughlin | May 18, 1926 |
| 1,719,869 | Boyd | July 9, 1929 |
| 1,735,692 | Nyrop | Nov. 12, 1929 |
| 1,908,230 | Fawkes | May 9, 1933 |
| 1,994,912 | Hochstetter | Mar. 19, 1935 |
| 2,056,296 | Robertson | Oct. 6, 1936 |
| 2,084,621 | Norris | June 22, 1937 |
| 2,086,921 | Norris | July 13, 1937 |

FOREIGN PATENTS

| Number | Country | Date |
|---|---|---|
| 292,940 | Great Britain | July 12, 1928 |
| 61,429 | Sweden | Aug. 31, 1926 |